US009305418B2

(12) United States Patent
Feuer et al.

(10) Patent No.: US 9,305,418 B2
(45) Date of Patent: Apr. 5, 2016

(54) VENDING MACHINE FOR SCRUBS WITH TIME EXPIRING BADGES AND RELATED METHODS

(71) Applicants: Jeffrey A. Feuer, Longwood, FL (US); Errol M. Orehek, Commack, NY (US); Robert J. Goldsher, Patchogue, NY (US)

(72) Inventors: Jeffrey A. Feuer, Longwood, FL (US); Errol M. Orehek, Commack, NY (US); Robert J. Goldsher, Patchogue, NY (US)

(73) Assignee: PRESCIENT LOGISTICS, LLC, Lake Mary, FL (US)

( * ) Notice: Subject to any disclaimer, the term of this patent is extended or adjusted under 35 U.S.C. 154(b) by 73 days.

(21) Appl. No.: 14/263,339

(22) Filed: Apr. 28, 2014

(65) Prior Publication Data

US 2015/0310693 A1 Oct. 29, 2015

(51) Int. Cl.

| | |
|---|---|
| ***G06F 17/00*** | (2006.01) |
| ***G07F 17/00*** | (2006.01) |
| ***G07F 7/10*** | (2006.01) |
| ***G07F 7/02*** | (2006.01) |
| ***G07F 9/02*** | (2006.01) |
| ***G07F 11/00*** | (2006.01) |
| ***G07F 11/72*** | (2006.01) |

(52) U.S. Cl.

CPC ............ *G07F 17/0092* (2013.01); *G07F 7/025* (2013.01); *G07F 7/10* (2013.01); *G07F 9/026* (2013.01); *G07F 11/002* (2013.01); *G07F 11/72* (2013.01)

(58) Field of Classification Search

None

See application file for complete search history.

(56) References Cited

U.S. PATENT DOCUMENTS

| | | | | | |
|---|---|---|---|---|---|
| 2,045,784 | A | | 6/1936 | Leve | |
| 5,544,062 | A | * | 8/1996 | Johnston, Jr. | G06Q 30/0621 700/117 |
| 5,638,985 | A | | 6/1997 | Fitzgerald | |
| 5,829,349 | A | | 11/1998 | Fitzgerald et al. | |
| 6,223,934 | B1 | * | 5/2001 | Shoenfeld | G07F 11/68 221/130 |
| 6,330,856 | B1 | * | 12/2001 | Fitzgerald | G07F 17/12 100/102 |
| 6,502,718 | B2 | | 1/2003 | Fitzgerald et al. | |
| 7,474,938 | B2 | * | 1/2009 | Poliner | G07F 7/06 221/13 |
| 8,164,454 | B2 | * | 4/2012 | Teller | G06Q 20/203 235/385 |
| 2001/0047309 | A1 | * | 11/2001 | Bartholomew | A45D 29/00 700/233 |
| 2004/0156535 | A1 | * | 8/2004 | Goldberg | G03D 15/001 382/115 |
| 2006/0217836 | A1 | * | 9/2006 | Poliner | G07F 7/06 700/237 |
| 2007/0051797 | A1 | * | 3/2007 | Randolph-Wall | G06Q 20/10 235/381 |
| 2013/0124307 | A1 | * | 5/2013 | Han | G06Q 30/0207 705/14.47 |
| 2013/0211585 | A1 | | 8/2013 | Broom et al. | |
| 2014/0244032 | A1 | * | 8/2014 | Repp | G07F 11/66 700/233 |

* cited by examiner

*Primary Examiner* — Prasad Gokhale

(74) *Attorney, Agent, or Firm* — Allen Dyer Doppelt Milbrath & Gilchrist

(57) ABSTRACT

A vending machine for scrubs may include a housing configured to store different sized scrubs. The vending machine also may include a scrub dispenser, a labeler, and a controller carried by the housing. The controller may be configured to cooperate with the scrub dispenser to dispense a selected sized scrub. The controller may also be configured to cooperate with the labeler to generate a time expiring badge for the selected sized scrub.

17 Claims, 6 Drawing Sheets

VENDING MACHINE FOR SCRUBS WITH TIME EXPIRING BADGES AND RELATED METHODS

FIELD OF THE INVENTION

The present invention relates generally to dispensing articles, and more specifically, to a vending machine for dispensing scrubs with time expiring badges and associated methods.

BACKGROUND OF THE INVENTION

In sterile patient care areas such as an operating room, a medical lab, or a procedural room, personnel typically wear surgical scrubs and caps. According to national regulatory guidelines, properly laundered scrubs should be worn when a person enters a sterile department and removed before leaving. Compliance to this protocol in and out of the operating room may be important in reducing cross contamination and healthcare-associated infections.

These regulatory guidelines may not only be applicable to hospital personnel, but also to sales representatives or vendors that enter an operating room to witness procedures and sell medical devices and implants. Typically, the hospital provides the sales representatives or vendors with scrubs at the hospital's own expense. However, the monitoring and tracking of the daily inventory of these scrubs can be difficult and expensive. Scrubs may be consistently lost resulting in further expense to the hospital.

Due to issues with inventory control, sales representatives or vendors may find it increasingly difficult to find a full set of scrubs in an appropriate size at any one hospital. As a result, it is not uncommon for a sales representative to continue wearing the same set of surgical scrubs throughout the day while visiting different hospitals.

Scrub dispensing devices have been developed to control the inventory and distribution of scrubs in a medical facility. For example, U.S. Pat. No. 5,638,985 to Fitzgerald et. al, discloses a vending machine for dispensing articles, such as scrub garments, that has multiple rows of slots that can store the scrubs. The rows are vertically stacked with a separate lockable door on each level and between each slot so that only a single slot may be accessible. Additionally, U.S. Pat. No. 6,223,934 to Shoenfeld, discloses a scrub dispenser cabinet for dispensing differently sized garment tops and bottoms to customers. A user is able select a preferred size scrub which is then dispensed via a system of wheels and belts. Also related to scrub dispensing, U.S. Pat. No. 7,474,938 to Poliner discloses an interactive automated article dispensing device that also includes a user credit tracking system for tracking a number of articles a user is authorized to have dispensed.

Unfortunately, these systems may not reduce the likelihood of the dispensed scrub from being worn by a user over a long period of time in different hospitals and operating rooms. Thus, further improvements may be desirable.

SUMMARY OF THE INVENTION

In view of the foregoing background, it is therefore an object of the present invention to provide a vending machine for dispensing scrubs to address inventory issues and address the possibility of scrubs being worn in multiple hospitals in the same day, for example. The vending machine may include a housing configured to store different sized scrubs. The vending machine also may include a scrub dispenser, a labeler, a controller carried by the housing. The controller may be configured to cooperate with the scrub dispenser to dispense a selected sized scrub. The controller may also be configured to cooperate with the labeler to generate a time expiring badge for the selected sized scrub. The labeler may be configured to print indicia on a first badge substrate, and the first badge substrate may be attachable to a second badge substrate carried by the selected sized scrub to define the time expiring badge. Accordingly, the dispenser provides inventory for scrub dispensing, and the time expiring badge may discourage over-extended wearing of the dispensed scrubs.

The vending machine may also include a communications interface carried by the housing and coupled to the controller. The controller may be configured to communicate with a remote station via the communications interface. The controller may be configured to receive user authorization from the remote station. Additionally, the controller may be configured to receive data relating to the selected sized scrub from the remote station. Further, the controller may be configured to receive user related information from the remote station and incorporate the user related information in the time expiring badge. The user related information may include, for example, at least one of a user name, a hospital where the user is, and a date of authorization of the user.

Additionally, the vending machine may also include a user interface carried by the housing. The controller may be configured to cooperate with the user interface to identify the user.

A method aspect is directed to a method for vending different sized scrubs stored in a housing of a vending machine for scrubs. The method may include operating a controller carried by the housing to cooperate with a scrub dispenser carried by the housing to dispense a selected sized scrub, and cooperate with a labeler carried by the housing to generate a time expiring badge for the selected sized scrub.

These and other object and aspects of the present invention will be better appreciated in view of the drawings and following detailed description of preferred embodiments.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Figure 1:
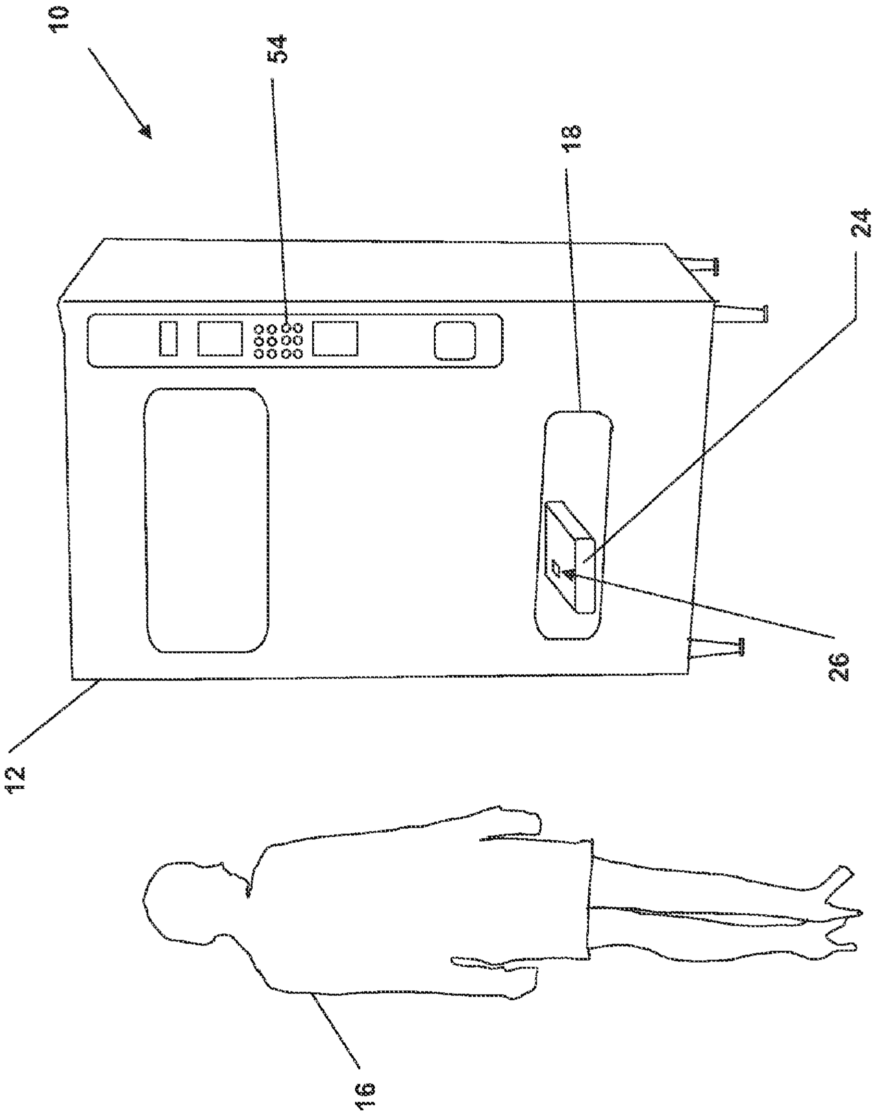
FIG. 1 is a perspective view of a vending machine for scrubs and a user in accordance with the invention.
Figure 2:
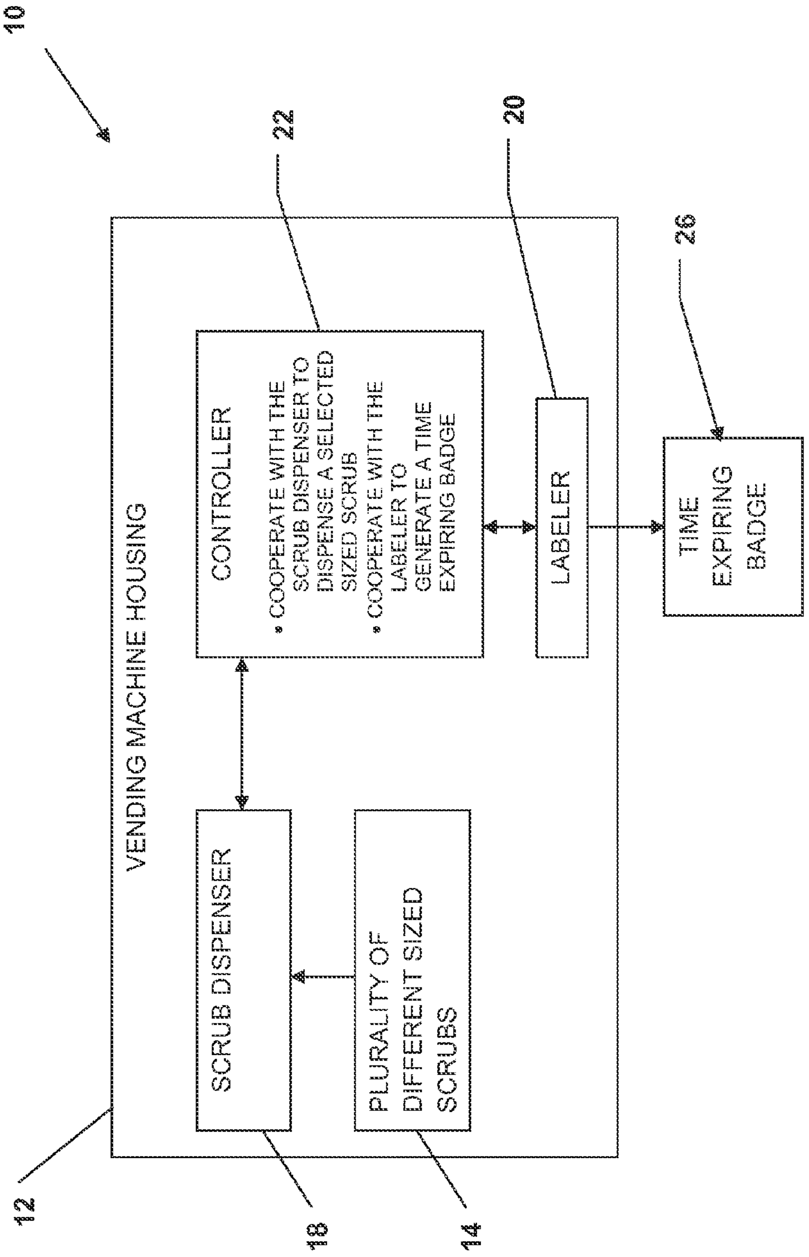
FIG. 2 is a block diagram of the vending machine for scrubs as shown in FIG. 1.

Referring initially to FIGS. 1 and 2, a vending machine 10 for scrubs is now described. The vending machine 10 illustratively includes a vending machine housing 12 configured to store a plurality of different sized scrubs 14. The scrubs may be, for example, a scrub shirt, a scrub pants, scrub shoe covers, a scrub cap, a scrub coverall, a lab coat, and the like. As those skilled in the art will appreciate, other scrub garments may be stored in the vending machine housing 12. In one embodiment, the plurality of different sized scrubs 14 may be arranged into a plurality of different scrub packs, with each scrub pack including scrubs of the same size. As one in the art will appreciate, this configuration may increase the likelihood that a user 16 may receive a full scrub outfit with each scrub being of the same size. Additionally, a scrub pack can provide additional rigidly and make dispensing of the scrubs easier. However, it may be possible that individual scrub garments are arranged in the vending machine. A Radio-Frequency Identification Tag may also be carried by the scrub to help monitor the location of each scrub. Of course, other technologies and techniques for monitoring the location of scrubs may be used.

In some embodiments, a scrub holding device may be carried by the vending machine housing 12 to support the plurality of different sized scrubs 14. The scrub holding device may include one or more shelves, trays, slots, cubbies, or the like. Advantageously, this configuration may allow the plurality of different sized scrubs 14 to be arranged in the vending machine housing 12 by size.

A scrub dispenser 18, a labeler 20, and a controller 22 are also carried by the vending machine housing 12. The controller 22 is configured to cooperate with the scrub dispenser 18 to dispense a selected sized scrub 24. In one embodiment, the scrub dispenser 18 may include a helical dispensing member, a motor coupled to the helical dispensing member, and a receiving bin. Advantageously, a scrub may be placed proximate the helical dispensing member and as the helical dispensing member rotates, the foremost scrub may be pushed into a receiving bin from which a user 16 can retrieve the selected sized scrub 24. Those of skill in the art will, however, appreciate other electrical mechanical arrangements for dispensing scrubs.

The controller 22 may cooperate with the labeler 20 to generate a time expiring badge 26 for the selected sized scrub 24. The labeler 20 may be, for example, a thermal printer, an ink-jet printer, or other printing devices known to those skilled in the art.

Figure 3:
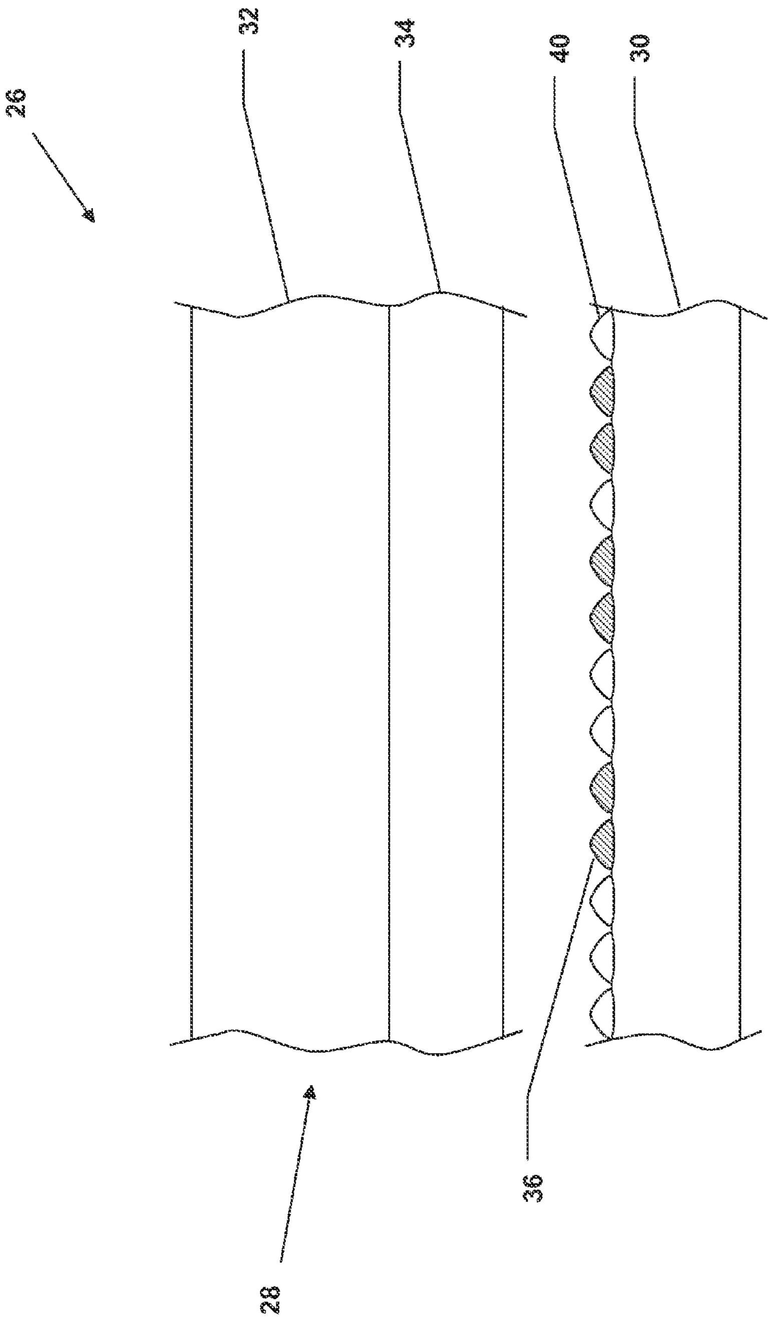
FIG. 3 is a greatly enlarged, exploded side view of a time expiring badge as produced by the vending machine shown in FIG. 1.

Referring now additionally to FIG. 3, the time expiring badge 26 illustratively includes a first badge substrate 28 and a second badge substrate 30. The first badge substrate 28 may include an opaque layer 32, such as vinyl, and a transparent adhesive layer 34. Migrating ink 36 is illustratively carried by the second badge substrate 30 and arranged to define an image, for example, alphanumeric characters, graphics, and the like.

As those skilled in the art will appreciate, when the first and second badge substrates 28, 30 are attached via the transparent adhesive layer 34, the migrating ink 36 migrates to the opaque layer 32 such that the image is viewable thereon. In one embodiment, the migration process takes 6 hours. It will be appreciated by those of skill in the art that this time may vary based upon the dimensions and materials used for the opaque layer 32 and the transparent adhesive layer 34. Illustratively non-migrating ink 40 may also carried by the second badge substrate 30. Advantageously, the non-migrating ink 40 may be of the same color as the migrating ink to decrease the visibility of the image defined by the migrating ink 36 prior to the migration process.

In other embodiments, the first badge substrate 28 can be include additional layers, for example, an enhancement layer through which the migrating ink 36 can concentrate and become easier to view. Additionally, it will be appreciated by those skilled in the art that the opaque layer 32 can be transparent and the transparent adhesive layer 34 can be opaque. Further details for these types of example badges can be found in U.S. Pat. Nos. 5,699,326 and 7,215,604, which are incorporated herein by reference in their entireties.

The controller 22 is configured to cooperate with the labeler 20 to print indicia onto the first badge substrate 28. The indicia may include the user related information, such as a user name and employer. The indicia may also include, for example, the name of the hospital where the vending machine 10 is located and a time the selected sized scrub 24 is dispensed. Of course, other indicia may be used.

Figure 4:
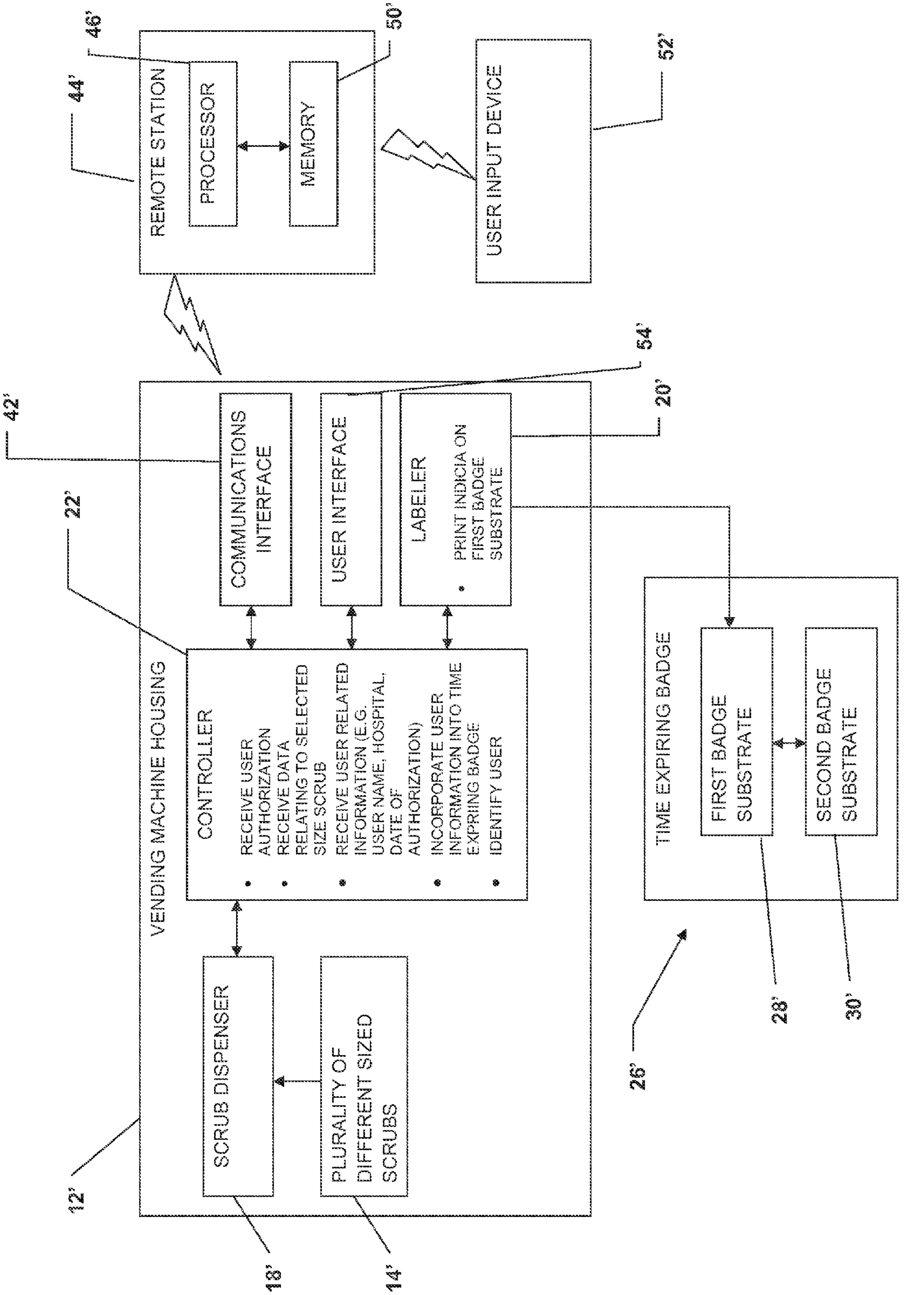
FIG. 4 is a block diagram of a vending machine for scrubs in accordance with another embodiment of the invention.

Referring to FIG. 4, in another embodiment, a communications interface 42' may also be carried by the vending machine housing 12' and coupled to the controller 22'. The communications interface 42' may be a wireless communications device. However, the communications interface 42' may be operable via a landline. The communications interface 42' allows the controller 22' to communicate with a remote station 44' that is remote from the vending machine housing 12' such as to receive data relating to the selected sized scrub 24', the user relation information, and/or the name of the hospital where the vending machine 10' is located. As recognized by those skilled in the art, other information may be received by the controller 22'. The remote station 44' may also receive information from the controller 22', for example, a number and size of the scrubs in the vending machine, a date and time a scrub is dispensed. Of course, other information may be sent between the controller 22' and the remote station 44'.

The remote station 44' may include a processor 46' and a memory 50' coupled thereto. The processor may be configured to receive the user related information from at least one user input device 52' wirelessly connected thereto. The processor 46' may also be configured to receive account information, such as, a password, user preferences, a user identification, a membership identification, and credit related information from the user input device. Of course, other information may be received by the processor 46' from the user input device 52', as those skilled in the art will appreciate. The user input device 52' may be a mobile wireless communications device, for example, a cellular telephone, smart phone, or tablet. The user input device 52' may be another type of electronic device capable of communicating with the processor over the internet, for example, a laptop computer, desktop computer, or the like. In some embodiments, a Quick-Response ("QR") code is carried by the vending machine housing 12' that may be entered into the user input device. The user related information and account information may be stored in the memory.

The processor 46' may be configured to perform functions in cooperation with the controller 22' and the user input device 52'. For example, the processor 46' may determine if the user 16' is authorized to receive scrubs from a particular vending machine 10'. The processor 46' may determine if credit information is sufficient and upon a determination that the credit information is sufficient, send data related to a selected sized scrub 24' to the controller 22' and deduct a value from the credit information. The processor 46' may also determine the number and size of different sized scrubs 14' carried by the vending machine housing 12' and generate the same to a user 16. The processor 46' may monitor and display images of various activity, for example, a user's purchase history, a vending machine's dispense history, the time and location a scrub is dispensed, the user 16 to whom a scrub is dispensed, user location over a period of time, sales related information. In some embodiments, the processor 46' may display this information only if an account is authorized. As will be appreciated by those skilled in the art, the remote station 44' may include a non-transitory computer readable medium that performs the functions of the processor 46' identified above.

The vending machine housing 12' may also carry a user interface 54' coupled to the controller 22'. The user interface 54' may be a keypad, numpad, or other input device known to those skilled in the art. Advantageously, the user interface 54' allows the dispensing of a scrub only upon the entry of a password or code thereby minimizing the likelihood of authorized users accessing the scrubs.

Figure 5:
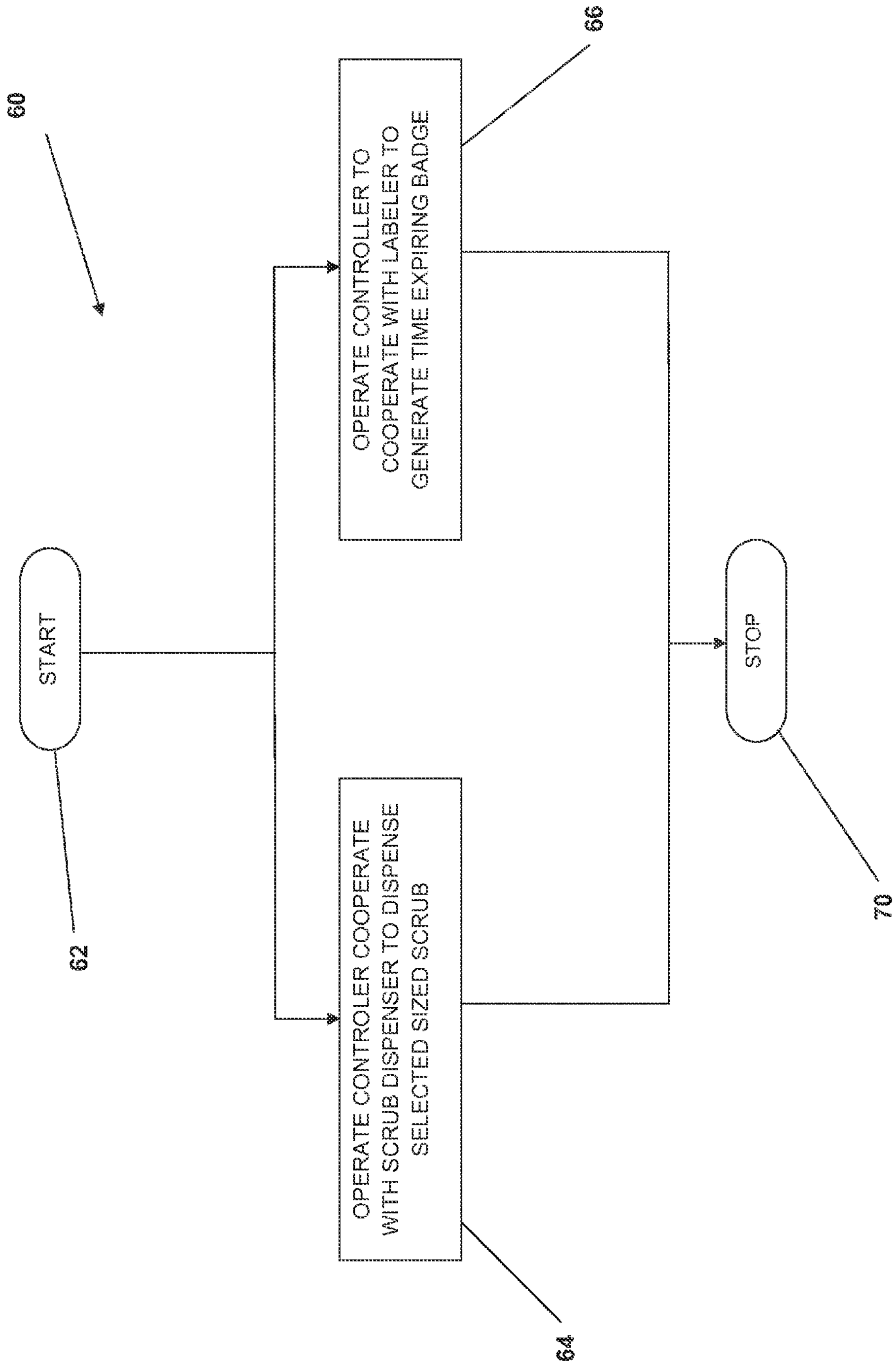
FIG. 5 is a flow diagram of a method for vending different sized scrubs stored in a housing of a vending machine for scrubs according to the invention.

A method aspect is directed to a method for vending different sized scrubs stored in a housing of a vending machine for scrubs. Referring now to the flowchart 60 in FIG. 5, beginning at Block 62, the method aspect includes, at Block 64, operating the controller 22 to cooperate with the scrub dispenser 18 to dispense a selected sized scrub 24. The method aspect also includes, at Block 66, operating the controller 22 to cooperate with the labeler 20 to generate a time expiring badge 26. As those skilled in the art will appreciate, the method aspect at Block 64, could occur prior to, simultaneously, or subsequent to the method aspect at Block 66. The method ends at Block 70.

Figure 6:
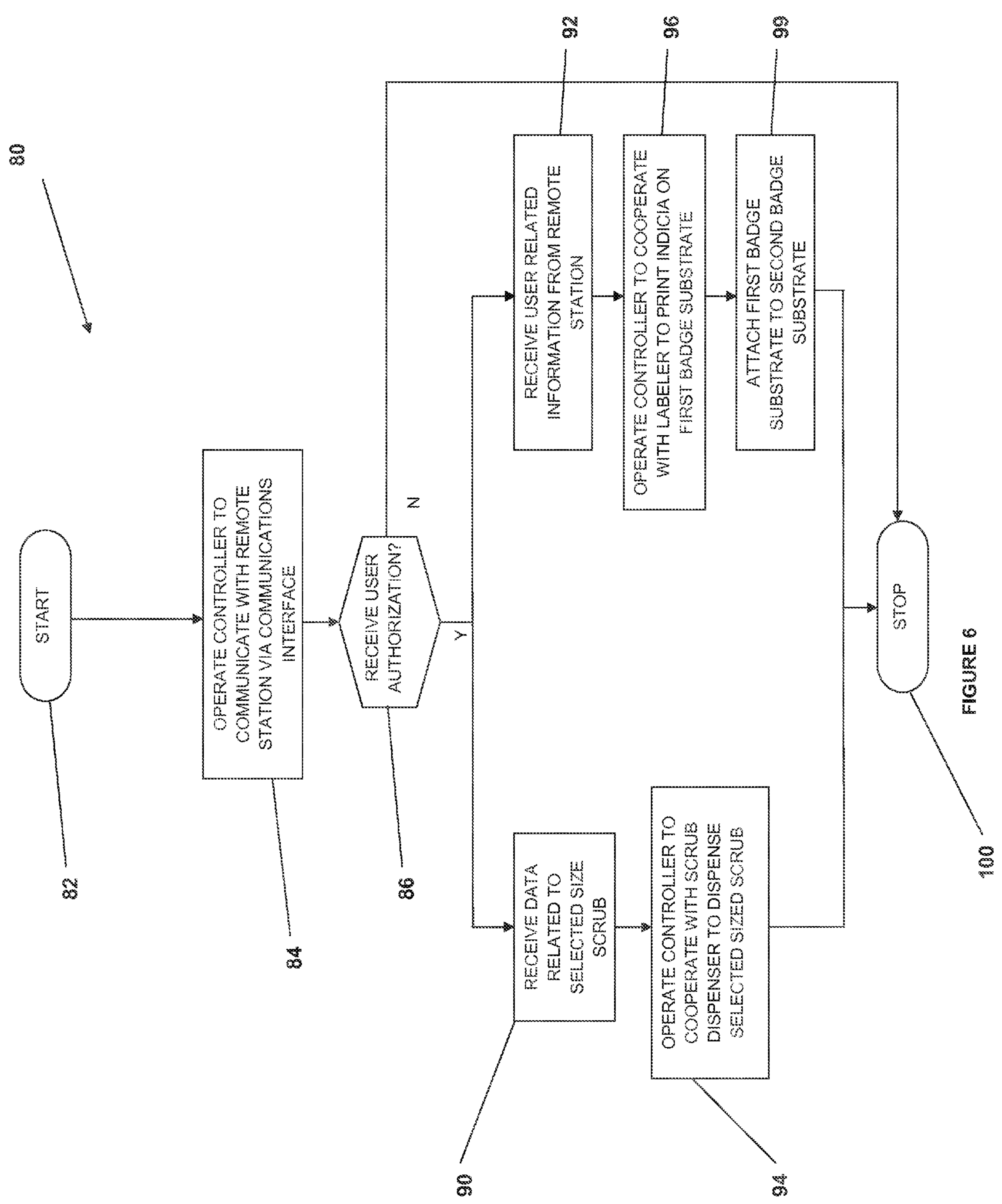
FIG. 6 is a flow diagram of a method for vending different sized scrubs stored in a housing of a vending machine for scrubs according to the invention as shown in FIG. 4.

Referring to the flowchart 80 in FIG. 6, beginning at Block 82 another embodiment of the method aspect includes, at Block 84, operating the controller 22 to communicate with a remote station 44' via a communications interface 42'. At Block 86, the method may include determining whether user authorization is received. If user authorization is not received, then the method ends.

If the user authorization is received, then, at Blocks 90, 92, the controller 22 may receive the data related to the selected sized scrub and user related information from the remote station 44'. In another embodiment, a processor 46' in the remote station 44' may determine if there is sufficient credit information before the controller 22 receives data related to the selected sized scrub and the user related information. If there is insufficient credit information, then the method ends, at Block 100. In some embodiments, a signal may issue to the user that the credit information is insufficient prior to the method ending. If there is sufficient credit information, a value is deducted from the credit information.

The method aspect may further include, at Block 94, operating the controller 22 to cooperate with the scrub dispenser 18 to dispense the selected sized scrub 24 based on the data relating to selected size scrub. Then, at Block 96, operating the controller 22 to cooperate with the labeler 20 to print user related information a first badge substrate 28 of the time expiring badge 26. As those skilled in the art will appreciate, the method aspect at Block 94, may occur prior to, simultaneously, or subsequent to the method aspect at Block 96. Then, at Block 98, the method aspect may include attaching the first badge substrate 28 to the second badge substrate 30. In the method aspect illustrated, the labeler 20 attaches the first badge substrate 28 to the second badge substrate 30. However, in another embodiment, the user 16 attaches the first badge substrate 28 to the second badge substrate 30. The method ends at Block 100.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

What is claimed is:

1. A vending machine for scrubs comprising:
a housing configured to store a plurality of different sized scrubs;
a scrub dispenser carried by said housing;
a labeler carried by said housing; and
a controller carried by said housing and configured to
cooperate with said scrub dispenser to dispense a selected scrub, and
cooperate with said labeler to generate a time expiring badge for the selected scrub;
wherein said labeler is configured to print indicia on a first badge substrate to be attachable to a second badge substrate carried by the selected scrub to define the time expiring badge.

2. The vending machine of claim 1, further comprising a communications interface carried by said housing and coupled to said controller; and wherein said controller is configured to communicate with a remote station via said communications interface.

3. The vending machine of claim 2, wherein said controller is configured to receive user authorization from the remote station.

4. The vending machine of claim 2, wherein said controller is configured to receive data relating to the selected scrub from the remote station.

5. The vending machine of claim 2, wherein said controller is configured to receive user related information from the remote station, and incorporate the user related information in the time expiring badge.

6. The vending machine of claim 5, wherein the user related information comprises at least one of a user name, hospital information, and a date of authorization of the user.

7. The vending machine of claim 1, further comprising a user interface carried by said housing; and wherein said controller is configured to cooperate with said user interface to identify a user.

8. A vending system for scrubs comprising:
a remote station; and
a vending machine comprising
a housing configured to store a plurality of different sized scrubs,
a scrub dispenser carried by said housing,
a labeler carried by said housing,
a communications interface carried by said housing, and
a controller carried by said housing and configured to
cooperate with said scrub dispenser to dispense a selected scrub,
cooperate with said labeler to generate a time expiring badge for the selected scrub, and
communicate with said remote station via said communications interface;
wherein said labeler is configured to print indicia on a first badge substrate to be attachable to a second badge substrate carried by the selected scrub to define the time expiring badge.

9. The vending system of claim 8, wherein said controller is configured to receive user authorization from said remote station.

10. The vending system of claim 8, wherein said controller is configured to receive data relating to the selected cizcd scrub from said remote station.

11. The vending system of claim 8, wherein said controller is configured to receive user related information from said remote station, and incorporate the user related information in the time expiring badge.

12. The vending system of claim 11, wherein the user related information comprises at least one of a user name, hospital information, and a date of authorization of the user.

13. A method for vending different sized scrubs stored in a housing of a vending machine for scrubs, the method comprising:

operating a controller carried by the housing to cooperate with a scrub dispenser carried by the housing to dispense a selected sized scrub, cooperate with a labeler carried by the housing to generate a time expiring badge for the selected sized scrub, and communicate with a remote station via a communications interface carried by the housing; and operating the labeler to print indicia on a first badge substrate to be attached to a second badge substrate carried by the selected sized scrub to define the time expiring badge.

14. The method of claim 13, further comprising operating the controller to receive user authorization from the remote station.

15. The method of claim 13, further comprising operating the controller to receive data relating to the selected scrub from the remote station.

16. The method of claim 13, further comprising operating the controller to receive user related information from the remote station, and incorporate the user related information in the time expiring badge.

17. The method of claim 13, wherein the user related information comprises at least one of a user name, hospital information, and a date of authorization of the user.

* * * * *